(12) United States Patent
Bonefas (10) Patent No.: US 8,649,940 B2
(45) Date of Patent: Feb. 11, 2014

(54) METHOD AND STEREO VISION SYSTEM FOR MANAGING THE UNLOADING OF AN AGRICULTURAL MATERIAL FROM A VEHICLE (75) Inventor: Zachary T Bonefas, Urbandale, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/419,818

(22) Filed: Mar. 14, 2012

(65) Prior Publication Data
US 2013/0211675 A1 Aug. 15, 2013

Related U.S. Application Data (60) Provisional application No. 61/597,325, filed on Feb. 10, 2012.

(51) Int. Cl.
A01B 69/00 (2006.01)
(52) U.S. Cl.
USPC .......... 701/41; 701/23; 701/28; 701/24; 460/114; 348/143
(58) Field of Classification Search
USPC .......... 701/50, 41, 409, 28, 26, 24, 23, 2; 56/10.2, 10.2 AR; 460/114, 119; 382/100, 103, 104; 141/1, 83; 702/150
See application file for complete search history.

(56) References Cited

U.S. PATENT DOCUMENTS 4,868,752 A * 9/1989 Fujii et al. ............... 701/28
5,579,228 A * 11/1996 Kimbrough et al. ...... 701/41
5,646,844 A 7/1997 Gudat et al.
5,712,782 A 1/1998 Weigelt et al.
5,749,783 A 5/1998 Pollklas
(Continued)

FOREIGN PATENT DOCUMENTS

EP 00002138027 A1 12/2009
EP 2301318 B1 11/2011
(Continued)

OTHER PUBLICATIONS

Borthwick, James Robert; Mining Haul Truck Pose Estimation and Load Profiling Using Stereo Vision. Aug. 2009. The University of British Columbia (Vancouver).

(Continued)

Primary Examiner — Tuan C. To
Assistant Examiner — Jelani Smith (57) ABSTRACT

A stereo imaging device on a propelled portion of the receiving vehicle collects image data. A container identification module identifies a container perimeter of a storage portion in the collected image data. A spout identification module is adapted to identify a spout of the harvesting vehicle in the collected image data. An alignment module is adapted to determine the relative position of the spout and the container perimeter and to generate command data to the propelled portion to steer the storage portion in cooperative alignment such that the spout is aligned within a central zone or target zone of the container perimeter. A steering controller is associated with a steering system of the propelled portion for steering the receiving vehicle in accordance with the cooperative alignment.

28 Claims, 7 Drawing Sheets

(56) References Cited

U.S. PATENT DOCUMENTS

| | | |
|---|---|---|
| 6,216,071 B1 | 4/2001 | Motz |
| 6,682,416 B2 | 1/2004 | Behnke et al. |
| 6,687,616 B1 | 2/2004 | Peterson et al. |
| 6,732,024 B2 | 5/2004 | Rekow et al. |
| 6,943,824 B2 | 9/2005 | Alexia et al. |
| 7,277,784 B2 | 10/2007 | Weiss |
| 8,060,283 B2 | 11/2011 | Mott et al. |
| 2007/0003107 A1* | 1/2007 | Wei et al. ............... 382/104 |
| 2009/0044505 A1* | 2/2009 | Huster et al. ............ 56/10.2 R |
| 2010/0063692 A1* | 3/2010 | Madsen et al. ............. 701/50 |
| 2010/0108188 A1 | 5/2010 | Correns et al. |
| 2010/0332051 A1 | 12/2010 | Kormann |
| 2011/0061762 A1* | 3/2011 | Madsen et al. ............. 141/1 |
| 2011/0064274 A1* | 3/2011 | Madsen et al. ........... 382/104 |
| 2011/0205084 A1 | 8/2011 | Morselli et al. |
| 2012/0215394 A1* | 8/2012 | Wang et al. ............... 701/24 |
| 2013/0024064 A1* | 1/2013 | Shepard .................. 701/23 |

FOREIGN PATENT DOCUMENTS

| | | |
|---|---|---|
| EP | 2311307 B1 | 12/2011 |
| EP | 00002020174 B1 | 2/2012 |
| JP | 2177815 A | 7/1990 |

OTHER PUBLICATIONS

Singh, Sanjiv; and Digney, Bruce; Autonomous Cross-Country Navigation Using Stereo Vision, Jan. 1999. Carnegie Mellon University, Pittsburgh, PA.

Dakota Micro. Inc., AgCam Photo Album [online]. 2009 [retrieved on May 29, 2012]. Retrieved from the internet: <URL:http://dakotamicro.com/docs/AgCam_Photo_Album.pdf>.

CLAAS, Agritechnica 2009: Two Golds and a Silver for CLAAS [online], 2009 [retrieved on May 29, 2012], Retrieved from the Internet: <URL:http://www.claas.com/cl-gr/en/press/mitteilungen/2009/start.cid=565120,bpSite=35108. lang=en_UK.html>.

* cited by examiner

METHOD AND STEREO VISION SYSTEM FOR MANAGING THE UNLOADING OF AN AGRICULTURAL MATERIAL FROM A VEHICLE

RELATED APPLICATION

This application claims the benefit of the filing date of and priority to U.S. Provisional Application Ser. No. 61/597,325, filed Feb. 10, 2012, which is incorporated herein by reference in its entirety.

FIELD OF THE INVENTION

This invention relates to a method and stereo vision system for managing the unloading of agricultural material from a vehicle.

BACKGROUND

Certain prior art systems may attempt to use global positioning system (GPS) receivers to maintain proper spacing between two vehicles during the unloading or transferring of an agricultural material between the vehicles. However, such prior art systems are susceptible to misalignment of the proper spacing because of errors or discontinuities in the estimated position of the GPS receivers. For example, one or more of the GPS receivers may misestimate its position because of electromagnetic interference, multipath propagation of the received satellite signals, intermittent reception of the satellite signals or low received signal strength of the satellite signals, among other things. Thus, there is a need for an improved system for managing the unloading of agricultural material from a vehicle to compensate for or address error in the estimated positions of the vehicles.

SUMMARY OF THE INVENTION

The system and method facilitates the transfer of agricultural material from a transferring vehicle (e.g., harvesting vehicle) to a receiving vehicle. The system and method comprises a receiving vehicle, which has a propelled portion for propelling the receiving vehicle and a storage portion for storing agricultural material. A stereo imaging device faces towards the storage portion of the vehicle. The imaging device can collect image data. A container identification module identifies a container perimeter of the storage portion in the collected image data. The storage portion has an opening, inward from the container perimeter, for receipt of the agricultural material. A spout identification module is adapted to identify a spout of the harvesting vehicle in the collected image data. An alignment module is adapted to determine the relative position of the spout and the container perimeter and to generate command data to the propelled portion to steer the storage portion in cooperative alignment such that the spout is aligned within a central zone of the container perimeter. A steering controller is associated with a steering system of the propelled portion for steering the receiving vehicle in accordance with the cooperative alignment.

DESCRIPTION OF THE PREFERRED EMBODIMENT

Figure 1:
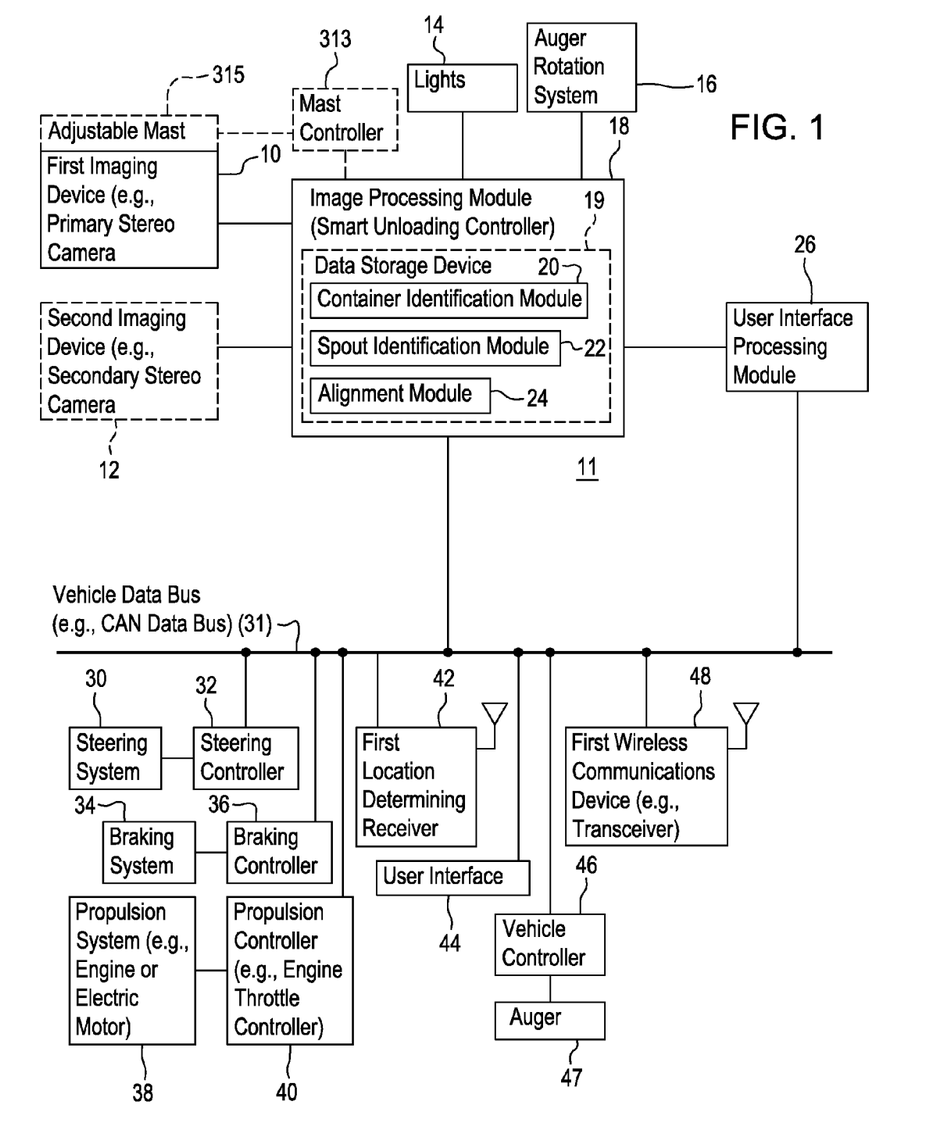
FIG. 1 is a block diagram of one embodiment of a stereo vision system for a transferring vehicle for managing the unloading of agricultural material from the transferring vehicle (e.g., combine).

In accordance with one embodiment, FIG. 1 shows a system 11 for a transferring vehicle for managing the unloading of agricultural material from the transferring vehicle (e.g., combine) to a receiving vehicle (e.g., grain cart or wagon). In one embodiment, the system 11 comprises a first imaging device 10 and second imaging device 12 coupled to an image processing module 18. The first imaging device 10 may comprise a primary stereo camera, while the second imaging device 12 may comprise a secondary stereo camera. In one configuration, the second imaging device 12 or secondary stereo camera is optional and provides redundancy to the first imaging device 10 in case of failure, malfunction or unavailability of image data from the first imaging device 10. In another configuration, the first imaging device 10 or the second imaging device 12 is mounted on a mast, a telescopic mast, a manually telescopic mast, a retractable mount, a rotatable mount (e.g., with remote control of the rotation angle), a pivotable arm (e.g., with manual or remotely controlled tilt and pan adjustment), or another support on the receiving vehicle, where any remotely actuated rotation or other adjustment of the mount by a mount actuator can be used to keep the storage portion 93 or container 85 (or its interior or its contents) within a field of view of the first imaging device 10 or the second imaging device 12. Alternately, the first imaging device 10 or the second imaging device 12 is mounted directly on the receiving vehicle at a high elevation or highest elevation of the receiving vehicle (e.g., such as the roof of the tractor cab) looking backwards towards a container 85 or storage portion 93 (e.g., grain cart). For example, the first imaging device 10 or the second imaging device 12 is mounted at sufficiently high elevation above ground level to have some visibility into the container 85 (e.g., grain cart), or sufficient visibility of the interior of the container 85 and its contents, to determine a profile, distribution or level of agricultural material (e.g., grain) within a volume or portion of the volume defined by the container 85.

The image processing module 18 may be coupled, directly or indirectly, to lights 14 on a vehicle (e.g., transferring vehicle) for illumination of a storage container and/or spout (e.g., 89 in FIG. 5), or for illumination of a field of view of the first imaging device 10, the second imaging device 12, or both for acquiring raw images (e.g., of sufficient brightness, contrast and color reproduction). For example, the image processing module 18 may control drivers or switches, which in turn control the activation or deactivation of lights 14 on the transferring vehicle. The image processing module 18 may activate the lights 14 on the vehicle for illumination of the storage container (e.g., 85 in FIG. 5), spout 89 or both if a light meter indicates that an ambient light level is below a certain minimum threshold. In one configuration, the light meter comprises a photo-sensor, photo-resistor, photo-sensitive device, or a cadmium-sulfide cell.

In one embodiment, the auger rotation system 16 may comprise: (1) a rotation angle sensor for sensing a spout rotation angle (e.g., 98 in FIG. 5) or other spout angles of the spout 89 with respect to one or more axes of rotation and (2) an actuator for moving the spout 89 to change the spout rotation angle or other spout angles; hence, the spout position with respect to the receiving vehicle 79 or its storage container 85. The actuator of the auger rotation system 16 may comprise one or more motors, a linear motor, an electro-hydraulic device, a ratcheting or cable-actuated mechanical device, or another device for moving the spout 89, or the spout end 87. The spout angle or spout rotation angle may comprise a simple angle, a compound angle or multi-dimensional angles that are measured with reference to any of the following: a reference axis parallel to the direction of travel of the transferring vehicle, a generally vertical axis, a generally horizontal axis, or an axis generally orthogonal to at least one of the generally vertical axis and the generally horizontal axis.

Where the system 11 of FIG. 1 is applied to a combine or a harvester, the spout 89 may be controlled in one or more dimensions (e.g., of rotation or movement). In one configuration, the auger rotation system 16 (of the harvester or combine) controls a rotation angle of the spout 89 in a generally horizontal plane or about a generally vertical axis. In another configuration, the auger rotation system 16 or spout controller may control one or more of the following angles: (1) rotation angle of the spout in a generally horizontal plane, (2) tilt angle in a relatively vertical plane, and (3) flap angle, where the rotation angle, tilt angle and flap angle are associated with mutually orthogonal axes. In one configuration, by controlling the rotation angle, the vehicle controller 54 may automatically extend or retract the spout 89 (e.g., unloading auger arm) when appropriate (e.g., when unloading of the agricultural material is complete).

The vehicle controller 46 controls the rotation of the auger 47 for transfer or movement of the agricultural material from the transferring vehicle 91 to the receiving vehicle 79. The vehicle controller 46 can provide a data message that indicates when the auger 47 for unloading agricultural material from the transferring vehicle is activate and inactive. The auger 47 may comprise an auger, an electric motor for driving the auger, and a rotation sensor for sensing rotation of the auger or its associated shaft. In one embodiment, the auger 47 is associated with a container for storing agricultural material (e.g., a grain tank) of a transferring vehicle 91 (e.g., a combine).

If the vehicle controller 46 indicates that the auger 47 of the transferring vehicle is rotating or active, the imaging processing module 18 activates the spout identification module 22 and container identification module 20. Thus, the vehicle controller 46 may conserve data processing resources or energy consumption by placing the container identification module 20 and the spout identification module 22 in an inactive state (or standby mode) while the transferring vehicle is harvesting, but not unloading, the agricultural material to the receiving vehicle.

If the image processing module 18 or another sensor determines that the container 85 or storage portion 93 has reached a target fill level (e.g., full or some percentage or fraction of capacity), the image processing module 18, vehicle controller 46, or auger rotation system 16 may automatically shut off the unloading auger 47.

The imaging processing module 18 may comprise a controller, a microcomputer, a microprocessor, a microcontroller, an application specific integrated circuit, a programmable logic array, a logic device, an arithmetic logic unit, a digital signal processor, or another data processor and supporting electronic hardware and software. In one embodiment, the image processing module 18 comprises a container identification module 20, a spout identification module 22, and an alignment module 24.

The image processing module 18 may be associated with a data storage device 19. The data storage device 19 may comprise electronic memory, non-volatile random access memory, a magnetic disc drive, an optical disc drive, a magnetic storage device or an optical storage device, for example. If the container identification module 20, the spout identification module 22 and the alignment module 24 are software modules they are stored within the data storage device 19.

Figure 5:
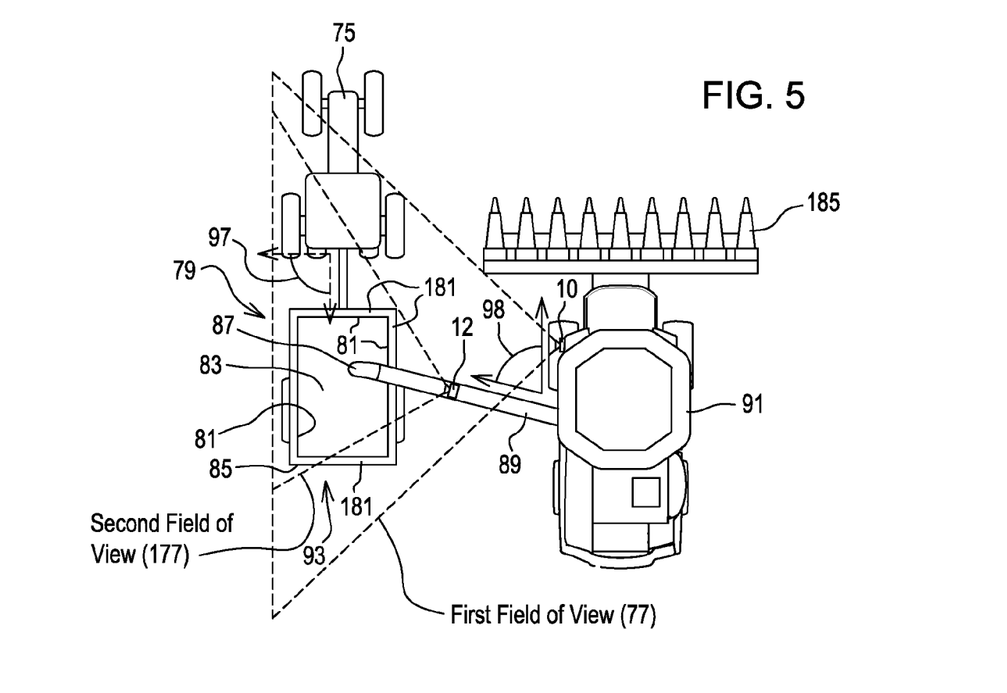
FIG. 5 illustrates a plan view of a stereo vision system mounted on a transferring vehicle and facing a receiving vehicle.

The container identification module 20 identifies a set of two-dimensional or three dimensional points (e.g., in Cartesian coordinates or Polar coordinates) in the real world that define at least a portion of the container perimeter (e.g., 81 in FIG. 5) of the storage portion (e.g., 85 in FIG. 5). The set of two-dimensional or three dimensional points correspond to pixel positions in images collected by the first imaging device 10, the second imaging device 12, or both. The container identification module 20 may use or retrieve container reference data.

The container reference data comprises one or more of the following: reference dimensions, reference shape, drawings, models, layout, and configuration of the container 85, the container perimeter 81, the container edges 181; reference dimensions, reference shape, drawings, models, layout, and configuration of the entire storage portion 93 of receiving vehicle; storage portion wheelbase, storage portion turning radius, storage portion hitch configuration of the storage portion 93 of the receiving vehicle. The container reference data may be stored and retrieved from the data storage device 19 (e.g., non-volatile electronic memory). For example, the container reference data may be stored by, retrievable by, or indexed by a corresponding receiving vehicle identifier in the data storage device 19 of the transferring vehicle system 11. For each receiving vehicle identifier, there can be a corresponding unique container reference data stored therewith in the data storage device 19.

In one embodiment, the transferring vehicle receives a data message from the receiving vehicle in which a vehicle identifier of the receiving vehicle is regularly (e.g., periodically transmitted). In another embodiment, the transferring vehicle interrogates the receiving vehicle for its vehicle identifier or establishes a communications channel between the transferring vehicle and the receiving vehicle in preparation for unloading via the wireless communication devices (48, 148). In yet another embodiment, the receiving vehicle transmits its vehicle identifier to the transferring vehicle when the receiving vehicle approaches the transferring vehicle within a certain radial distance. In still another embodiment, only one known configuration of receiving vehicle is used with a corresponding transferring vehicle and the container reference data is stored or saved in the data storage device 10. In the latter embodiment, the transferring vehicle is programmed, at least temporarily, solely for receiving vehicles with identical containers, which are identical in dimensions, capacity, proportion and shape.

If the linear orientation of a set of pixels in the collected image data conforms to one or more edges 181 of the perimeter (81 in FIG. 5) of the container (85 in FIG. 5) as prescribed by the container reference data, the position of the container has been identified. A central region or central zone of the container opening 83 of the container 85 can be identified by dividing the distance (e.g., shortest distance or surface normal distance) between opposite sides of the container, or by indentifying corners of the container and where diagonal lines that intercept the corners intersect, among other possibilities.

The spout identification module 22 identifies one or more of the following: (1) the spout pixels on at least a portion of the spout 89 (in FIG. 5), or (2) spout end pixels that are associated with the spout end 87 of the spout 89 (in FIG. 5). The spout identification module 22 may use color discrimination, intensity discrimination, or texture discrimination to identify background pixels from one or more selected spout pixels with associated spout pixel patterns or attributes (e.g., color or color patterns (e.g., Red Green Blue (RGB) pixel values), pixel intensity patterns, texture patterns, luminosity, brightness, hue, or reflectivity) used on the spout 89 or on the spout end 87 of the spout 89 for identification purposes.

The alignment module 24 estimates motion commands at regular intervals to maintain alignment of the spout 56 over the central zone, central region or target of the container 85 for unloading agricultural material. The alignment module 24 may send commands to the transferring vehicle with respect to its speed, velocity or heading to maintain alignment of the position of the transferring vehicle with respect to the receiving vehicle. For example, the alignment module 24 may transmit a steering command or heading command to the steering controller 32, a braking or deceleration command to a braking system 34, and a propulsion, acceleration or torque command to a propulsion controller 40. Further, similar command data may be transmitted via the wireless communication devices (48, 148) to the receiving vehicle for observational purposes or control of the receiving vehicle via its steering system controller 32, its braking controller 36, and its propulsion controller 40 of the system 311 of FIG. 4. In one configuration, the alignment module 24 transmits a steering command or heading command to the steering controller 32, a braking or deceleration command to a braking system 34, and a propulsion, acceleration or torque command to a propulsion controller 40 to maintain a generally uniform spatial separation or distance between a first imaging device 10 (e.g., on the propulsion portion of the receiving vehicle or on the transferring vehicle) and the spout end 87 of the spout 89.

The propulsion controller 40 may facilitate an even distribution of agricultural material in the storage portion 93 or container 85 by acceleration or deceleration of the receiving vehicle or its propulsion portion 75 to redistribute evenly or move the agricultural material in the storage portion 93 or the container 85. In one example, a propulsion controller 40 temporarily increases its ground speed, or alternately a relative speed of the receiving vehicle relative to the transferring vehicle, if an image processing module 18 senses that a front volume of the storage portion is currently filled to a target level (with agricultural material) or until the entire storage portion 93 reaches the target fill level. Conversely, propulsion controller 40 temporarily decreases its ground speed, or alternately a relative speed of the receiving vehicle relative to the transferring vehicle, if an image processing module 18 senses that a rear volume of the storage portion is currently filled (with agricultural material) to a target level or until the entire storage portion 93 reaches the target fill level.

The image processing module 18 provides image data to a user interface processing module 26 that provides, directly or indirectly, status message data and performance message data to a user interface 44. As illustrated in FIG. 1, the image processing module 18 communicates with a vehicle data bus 31 (e.g., Controller Area Network (CAN) data bus).

In one embodiment, a location determining receiver 42, a first wireless communications device 48, a vehicle controller 46, a steering controller 32, a braking controller 36, and a propulsion controller 40 are capable of communicating over the vehicle data bus 31. In turn, the steering controller 32 is coupled to a steering system 30 of the transferring vehicle; the braking controller 37 is coupled to the braking system 34 of the transferring vehicle; and the propulsion controller 40 is coupled to the propulsion system 38 of the transferring vehicle.

Figure 6:
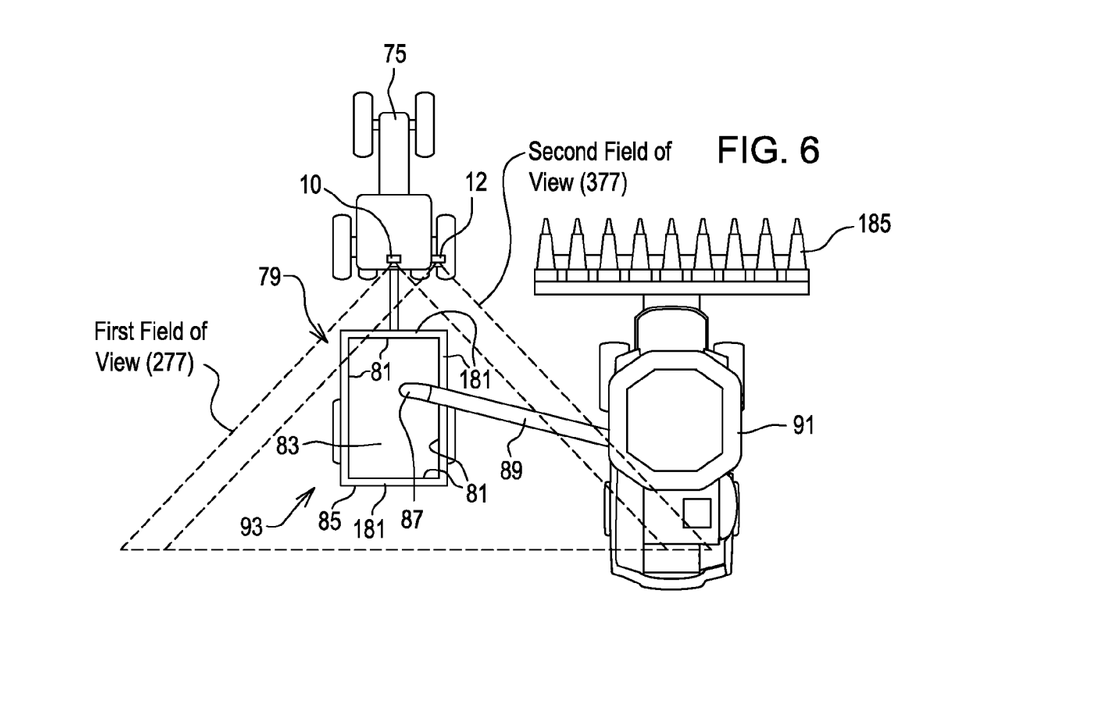
FIG. 6 illustrates a plan view of a stereo vision system mounted on a receiving vehicle and facing toward a container portion of the receiving vehicle.

The system 11 facilitates the transfer of agricultural material from the transferring vehicle (e.g., a harvesting vehicle) to a receiving vehicle. The system 11 comprises a receiving vehicle with a propelled portion for propelling the receiving vehicle and a storage portion 93 for storing agricultural material. A stereo imaging device, such as the first imaging device 10, faces towards the storage portion 93 of the receiving vehicle. As shown in FIG. 1, the first imaging device 10 and the second imaging device 12 are mounted on the transferring vehicle, consistent with FIG. 5. However, in alternate embodiments, the first imaging device 10 and the optional second imaging device 12 may be mounted on the receiving vehicle or the propulsion portion 75 of the receiving vehicle as shown in FIG. 6.

In one embodiment, an optional mast controller 313, indicated by dashed lines, is coupled to the vehicle data bus, the implement data bus, or the image processing module 18 to control an optional adjustable mast 315 for mounting and adjustably positioning the first imaging device 10, the second imaging device 12, or both. The mast controller 313 and its associated adjustable mast 315 are adapted to change the orientation or height above ground of the first imaging device 10, the second imaging device 12 or both, where the orientation may be expressed as any of the following: a tilt angle, a pan angle, a down-tilt angle, a depression angle, or a rotation angle. The adjustable mast 315 may be associated with one or more servo-motors, linear motors, or other devices for controlling the movement, height and angles of imaging devices (10, 12) mounted on the adjustable mast 315. For example, an operator may control or adjust the height or orientation of one or more imaging devices (10, 12) via a user interface. In an alternate embodiment, the optional mast controller 313 and adjustable mast 315 may be replaced by a manually adjustable mast, rather than a remotely controllable adjustable mast 315.

One or more imaging devices (10, 12) are arranged to collect image data. A container identification module 20 identifies a container perimeter of the storage portion 93 in the collected image data. The storage portion 93 has an opening inward from the container perimeter for receipt of the agricultural material. A spout identification module 22 is configured to identify a spout (e.g., 89 of FIG. 5) of the harvesting vehicle in the collected image data. An alignment module 24 is adapted for determining the relative position of the spout 89 and the container perimeter (81 of FIG. 5) and for generating command data to the transferring vehicle or the propelled portion 75 of the receiving vehicle 79 to steer the storage portion 93 in cooperative alignment such that the spout 89 is aligned within a central zone 83 of the container perimeter 81. A steering controller 32 is associated with a steering system 30 of the propelled portion for steering the receiving vehicle in accordance with the cooperative alignment.

In one configuration, a user interface 44 is arranged for entering container reference data or dimensional parameters related to the receiving vehicle. For example, the container reference data or dimensional parameters comprise a distance between a trailer hitch (which interconnects the propulsion unit 75 and the storage portion 93) and front wheel rotational axis of the storage portion 93 of the receiving vehicle 79.

Although the first imaging device 10 and the second imaging device 12 may comprise stereo imaging devices or monocular imaging devices that are combined to provide stereo vision image data, in an alternative embodiment the first imaging device 10 and the optical second imaging device 12 may be replaced by any of the following: a range finding device, a laser scanner, a laser range finder, a Lidar (light detection and ranging system), a radar sensor (radio detection and ranging), a range finder that uses time of flight of an electromagnetic signal to establish a range to an object, or another perception device.

The system 11 of FIG. 1 is well suited for use on a combine or harvester as the transferring vehicle. The system 11 of FIG. 1 may communicate and cooperate with a second system (211 or 311) on the receiving vehicle to coordinate the relative alignment of the transferring vehicle and the receiving vehicle during unloading or transferring of material from the transferring vehicle. Like reference numbers in FIG. 1 and FIG. 2 indicate like elements.

Figure 2:
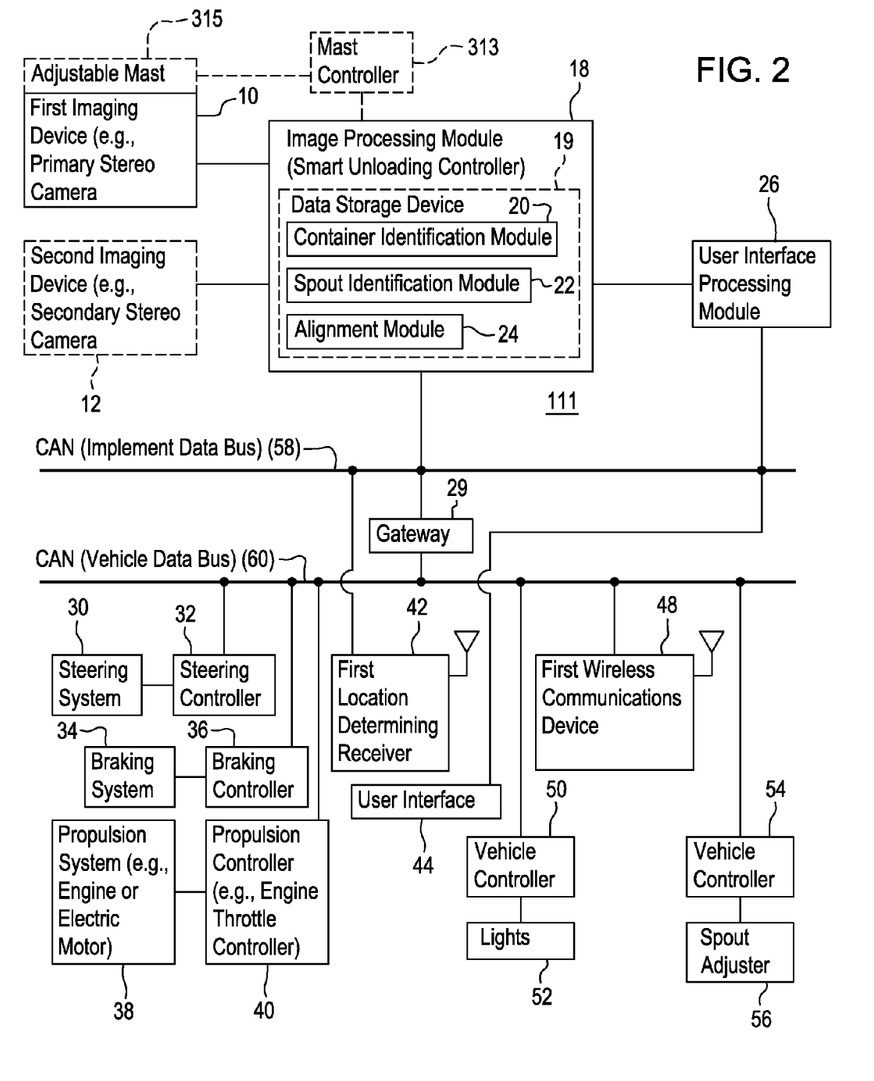
FIG. 2 is a block diagram of another embodiment of a stereo vision system for a transferring vehicle for managing the unloading of agricultural material from the transferring vehicle (e.g., a self-propelled forage harvester).

The system 111 of FIG. 2 is similar to the system 11 of FIG. 1; except that the system 111 of FIG. 2 further comprises an implement data bus 58, a gateway 29, and vehicle controllers (50, 54) coupled to the vehicle data bus 60 for the lights 14 and spout 89. The vehicle controller 50 controls the lights 14; the vehicle controller 54 controls the spout adjuster 56 for moving or adjusting the orientation or angle of the spout 89, or its spout end 87. The spout adjuster 56 may comprise an actuator for moving or adjusting the spout 89 and one or more sensors for measuring the spout angle, orientation, or position of the spout 89. For instance, the spout adjuster 56 or its actuator may comprise a servo-motor, electric motor, or an electro-hydraulic mechanism for moving or adjusting the spout 89.

Where the system 111 of FIG. 2 is applied to a self-propelled forage harvester, the vehicle controller 54 and spout adjuster 56 may control or adjust spout 89 in multiple dimensions, such as two or three dimensions. For example, the vehicle controller 54 or spout controller may control one or more of the following angles: (1) rotation angle of the spout in a generally horizontal plane, (2) tilt angle in a relatively vertical plane, and (3) flap angle, where the rotation angle, tilt angle and flap angle are associated with mutually orthogonal axes. For a forage harvester, the spout 89 (e.g., unloading auger arm) is not usually retracted and the flow of agricultural material from the spout 89 is generally continuous during harvesting.

If a container 85 of the receiving vehicle is full (or imminently approaching a full state) with agricultural material (e.g., from a transferring operation), as detected by one or more sensors (e.g., mass or optical sensors) on the receiving vehicle 79 for detecting a mass, weight or volume of agricultural material in the container 85; the imaging system 18 of the transferring vehicle 91 or the sensors of the receiving vehicle via the wireless communications devices (48, 148) may notify the operator (of the transferring vehicle 91) on the user interface 44 of the full state, fill state or full condition of the container 85. In response to the full state or near full state (e.g., approximately 90 percent or more of full capacity) of the container 85 (e.g., and in the context of a forage harvester as the transferring vehicle 91), the system (111) of FIG. 2 may: (1) maintain a last position and orientation of the spout 89 to continue to unload agricultural material in the same location, (2) sweep the spout 89 or spout end 87 back and forth in a continuous or incremental motion to continue to evenly distribute the material in the container 85, and (3) reduce the rate of transfer (e.g., auger rotational speed) of the agricultural material into the container 85.

In one configuration, the implement data bus 58 may comprise a Controller Area Network (CAN) implement data bus. Similarly, the vehicle data bus 60 may comprise a controller area network (CAN) data bus. In an alternate embodiment, the implement data bus 58, the vehicle data bus 60, or both may comprise an ISO (International Organization for Standardization) data bus or ISOBUS, Ethernet or another data protocol or communications standard.

The gateway 29 supports secure or controlled communications between the implement data bus 58 and the vehicle data bus 60. The gateway 29 comprises a firewall or another security device that may restrict or prevent a network element or device on the implement data bus 58 from communicating (e.g., unauthorized communication) with the vehicle data bus 60 or a network element or device on the vehicle data bus 31, unless the network element or device on the implement data bus 58 follows a certain security protocol, handshake, password and key, or another security measure. Further, in one embodiment, the gateway 29 may encrypt communications to the vehicle data bus 60 and decrypt communications from the vehicle data bus 60 if a proper encryption key is entered, or if other security measures are satisfied. The gateway may allow network devices on the implement data bus 58 that communicate via an open standard or third party hardware and software suppliers, whereas the network devices on the vehicle databus 60 are solely provided by the manufacturer.

In FIG. 2, a location determining receiver 42, a user interface 44, a user interface processing module 26, and the gateway 29 are coupled to the implement data bus 58. Vehicle controllers (50, 54) are coupled to the vehicle data bus 60. In turn, the vehicle controllers (50, 54) are coupled, directly or indirectly, to lights 14 on the transferring vehicle and the spout 89 of the transferring vehicle (e.g., self propelled forage harvester). Although the system of FIG. 2 is well suited for use or installation on a self-propelled forage harvester, the system of FIG. 2 may also be applied to combines, harvesters or other heavy equipment.

Figure 3:
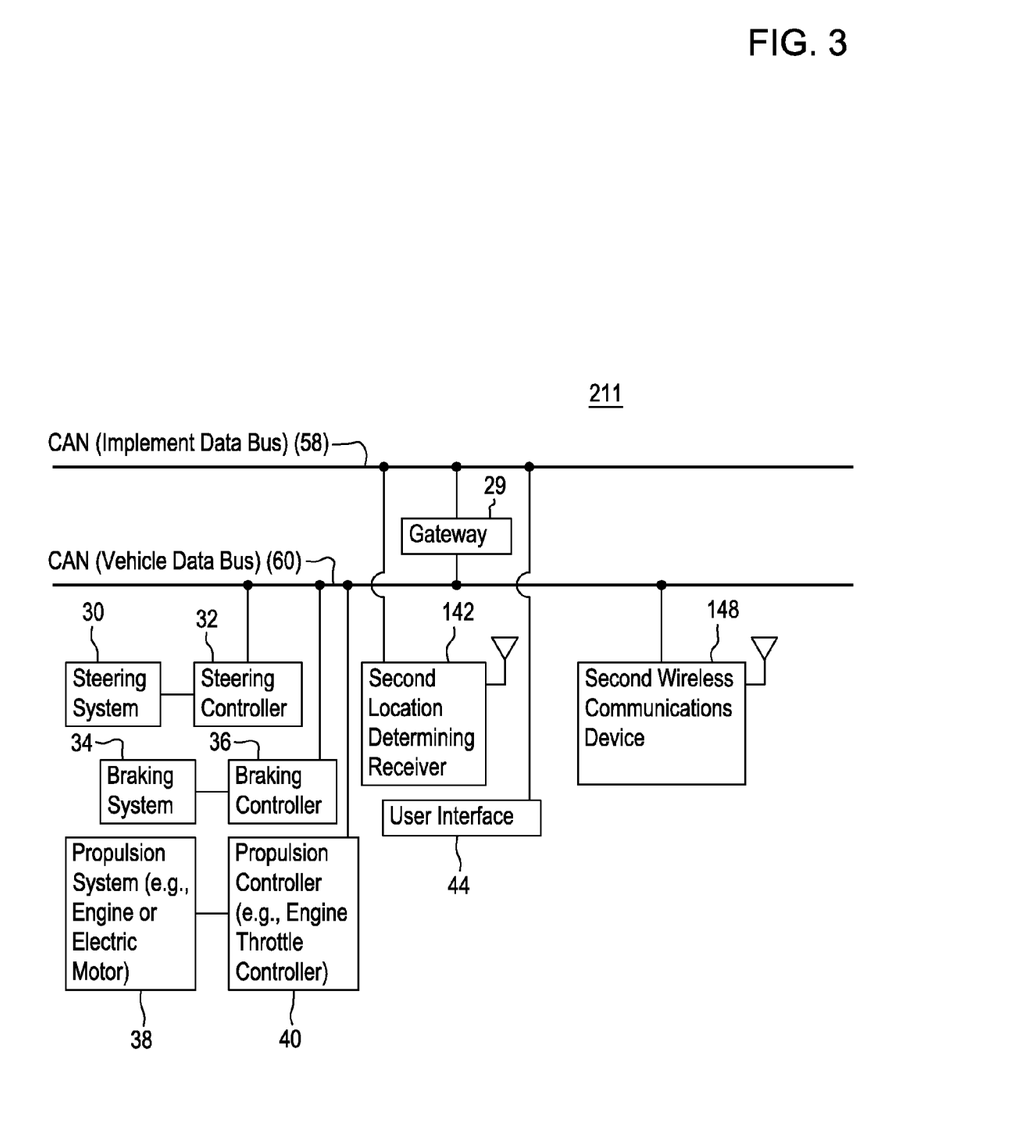
FIG. 3 is a block diagram of an embodiment of a system for a receiving vehicle (without stereo vision) for managing the unloading of agricultural material from a vehicle.

The system 11 of FIG. 1 and the system 111 of FIG. 2 apply to the transferring vehicle, whereas the system of FIG. 3 applies to the receiving vehicle. Like reference numbers in FIG. 2 and FIG. 3 indicate like elements. As previously noted, the transferring vehicle comprises a combine, harvester, self-propelled harvester, vehicle or heavy equipment that collects or harvests material for transfer to the receiving vehicle. In one embodiment, the receiving vehicle comprises a propelled portion (e.g., 75 in FIG. 5) and a storage portion (e.g., 93 in FIG. 5) for storing the material transferred from the transferring vehicle. The receiving vehicle may comprise the combination of a tractor and a grain cart or wagon, where the tractor is an illustrative example of the propelled portion 75 and where the grain cart is an illustrative example of the storage portion 93. In one embodiment, FIG. 3 illustrates a propelled portion 75 (e.g., tractor) without a first imaging device 10 or a second imaging device 12 on the propelled portion 75. Like reference numbers in FIG. 2 and FIG. 3 indicate like elements.

The system 211 of FIG. 3 is similar to the system of FIG. 2, except the system of FIG. 3 deletes the first imaging device 10, the second imaging device 12, the image processing module 18, the user interface 44, the user interface processing module 26, the vehicle controllers (50, 54), the lights 52 and spout 56 from FIG. 2. The system 211 of FIG. 3 comprises a second wireless communications device 148 for communicating with the first communications device 48 of FIG. 1 or FIG. 2, for example. The wireless devices (48, 148) may exchange or communicate position date, relative position data, command data, or control data for controlling, adjusting or coordinating the position and orientation of the vehicles; more particularly, the position and the orientation of the spout 89 or spout end 87 over the opening 83 of the container 85. The second wireless communications device 148 is coupled to the vehicle data bus 31. In FIG. 3, the system 211 for a receiving vehicle (without stereo vision) can be used in conjunction with the system (11 or 111) of the transferring vehicle of FIG. 1 or FIG. 2.

Figure 4:
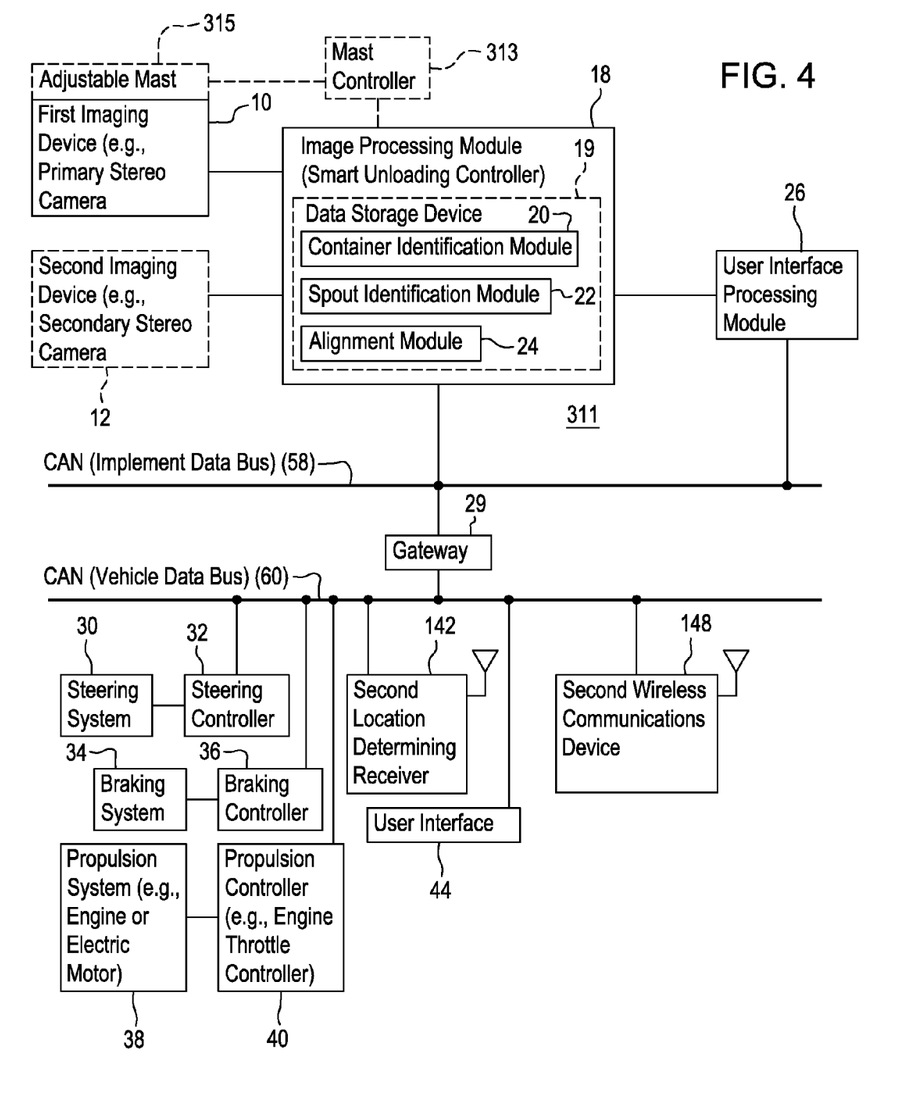
FIG. 4 is a block diagram of an embodiment of a stereo vision system for a receiving vehicle for managing the unloading of agricultural material from a transferring vehicle.

The system 311 of FIG. 4 applies to the receiving vehicle. As previously noted, the transferring vehicle comprises a combine, harvester, self-propelled harvester, vehicle or heavy equipment that collects or harvests material for transfer to the receiving vehicle. In one embodiment, the receiving vehicle comprises a propelled portion 75 and a storage portion 93 for storing the material transferred from the transferring vehicle. The receiving vehicle 79 may comprise the combination of a tractor and a grain cart or wagon, where the tractor is an illustrative example of the propelled portion 75 and where the grain cart is an illustrative example of the storage portion 93. Like reference numbers in FIG. 1, FIG. 3 and FIG. 4 indicate like elements.

In one embodiment, the first imaging device 10 and the optional second imaging device 12 (shown in dashed lines) are mounted on the propelled portion 75 (e.g., tractor) of the receiving vehicle facing backwards towards the storage portion 93 (e.g., cart) or container 85. The system of FIG. 4 adds the first imaging device 10, the second imaging device 12, the image processing module 18, and the user interface processing module 26 to the system of FIG. 3. The system of FIG. 4 comprises a second wireless communications device 148 for communicating with the first communications device 48 of FIG. 1 or FIG. 2, for example. The second wireless communications device 148 is coupled to the vehicle data bus 60. In FIG. 4, the system 311 for the receiving vehicle with stereo vision can be used in conjunction with any system (11 or 111) of the transferring vehicle of FIG. 1 and FIG. 2 disclosed in this document.

The system 311 of FIG. 4 may support different configurations or combinations of electronic systems at the transferring and receiving vehicles. In a first configuration, one or more imaging devices (10, 12) on the receiving vehicle may be used instead of, or with, one or more imaging devices (10, 12) on the transferring vehicle. In a second configuration, the system 311 of FIG. 4 may provide collected image processing data from the receiving vehicle to the transferring vehicle via the transmission of the collected image processing data from the second wireless communications device 148 to the first wireless communications device 48. Here, in a second configuration, the collected imaging processing data from the receiving vehicle may be referred to as supplementary data, complementary image data, or additional image data. The additional image data may provide additional perspective or viewpoints that can supplement the image data collected by the transferring vehicle. For example, the additional image data may provide more accurate or supplement image data where the image data collected by the transferring vehicle is affected by moisture (e.g., on its lens), dust, poor ambient lighting, glare or reflections that do not similarly impair or impact the additional image data.

FIG. 5 illustrates a plan view of a transferring vehicle 91 and a receiving vehicle 79. As illustrated in FIG. 5 for explanatory purposes, the transferring vehicle 91 is shown as a combine with a harvesting head 185, whereas the receiving vehicle 79 is show as a tractor and a grain cart. The receiving vehicle 79 comprises the combination of a propulsion unit 75 and a storage unit 93 (e.g., a towed storage unit).

FIG. 5 shows a first imaging device 10 on the transferring vehicle (e.g., combine) and an optional second imaging device 12 on a spout 89 of the transferring vehicle 91. The spout 89 may also be referred to as the unloading auger. The spout end 87 may be referred to as boot, which can be a hard rubber piece at the tip of the spout to direct the unloaded material (e.g., downward). The first imaging device 10 has a first field of view 77, indicated by the dashed lines. The second imaging device 12 has a second field of view 177, indicated by the dashed lines. In FIG. 5, the spout 89, or the spout end 87, is generally aligned over a central zone, central region or target area of the storage container 85 (of the receiving vehicle) for unloading material from the transferring vehicle to the receiving vehicle. Similarly, the transferring vehicle and the receiving vehicle are aligned in position as shown, regardless of whether the vehicles move together in a forward motion (e.g., with coordinated or tracked vehicle headings) during harvesting, as is typical, or are stationary.

FIG. 6 illustrates a plan view of a transferring vehicle and a receiving vehicle. Like reference numbers indicate like elements in FIG. 5 and FIG. 6. FIG. 6 shows a first imaging device 10 on the rear of the propulsion unit 75 (e.g., tractor) or the receiving vehicle 79. The first imaging device 10 has a first field of view 277 indicated by the dashed lines. In FIG. 6, the spout 89 or spout end 87 is generally aligned over a central zone, central region or target area of the storage unit 93 or container 85 for unloading material from the transferring vehicle to the receiving vehicle. Similarly, the transferring vehicle and the receiving vehicle are aligned in position as shown, and even as the vehicles move with coordinated headings. An optional second imaging device 12 may be mounted on the vehicle with a second field of view 377, which may be slightly offset from, overlapped with, or aligned with the first field of view 277 to provide redundancy should the first imaging device 10 fail, malfunction, be unavailable, be unreliable. For example, the first imaging device 10 may not operate reliably where it is obscured by dust, fog, salt, or air-born contaminants, or where it is exposed to inadequate ambient light conditions or excessive glare from sunlight or reflected light.

Figure 7:
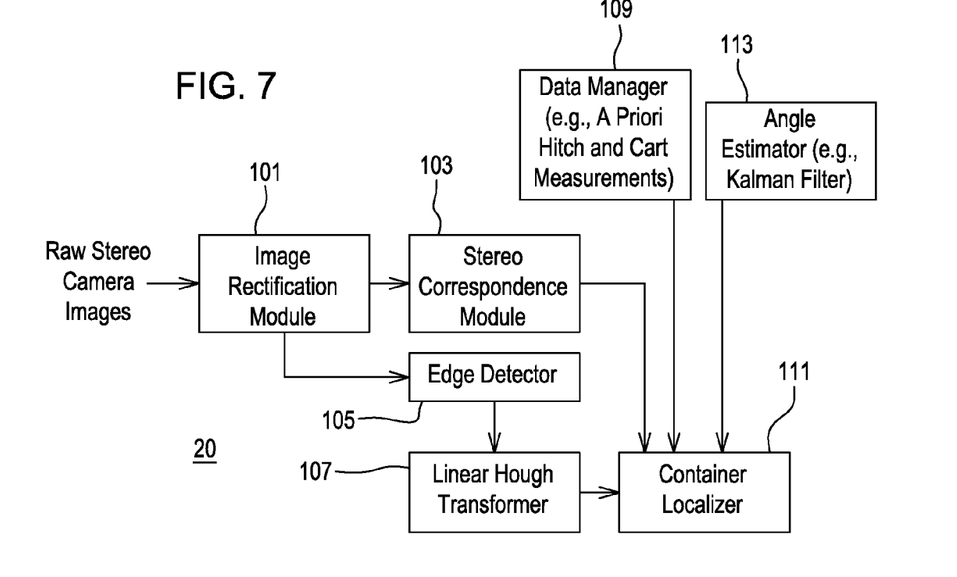
FIG. 7 is a flow chart of one method for a stereo vision system for managing the unloading of agricultural material from a vehicle (e.g., combine).
Figure 8:
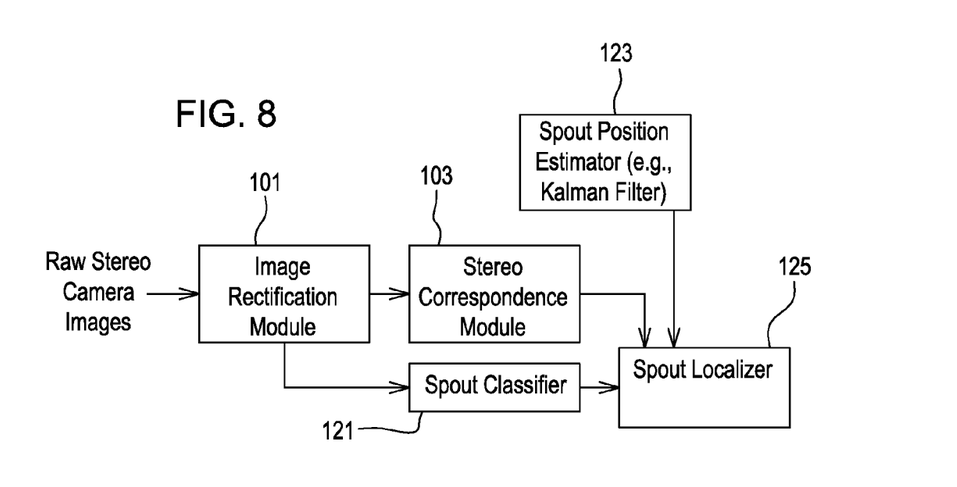
FIG. 8 is a flow chart of another method for a stereo vision system for managing the unloading of agricultural material from a vehicle (e.g., combine).

In FIG. 7 and FIG. 8, each of the blocks or modules may represent software modules, electronic modules, or both. Software modules may contain software instructions, subroutines, object-oriented code, or other software content. The arrows that interconnect the blocks or modules of FIG. 7 show the flow of data or information between the blocks. The arrows may represent physical communication paths or virtual communication paths, or both. Physical communication paths mean transmission lines or one or more data buses for transmitting, receiving or communicating data. Virtual communication paths mean communication of data, software or data messages between modules.

FIG. 7 is a block diagram that shows the imaging processing module 18 and the container identification module 20 in greater detail than FIG. 1. Like reference numbers in FIG. 1, FIG. 7, and FIG. 8 indicate like elements. As illustrated in FIG. 7, the first imaging device 10, the second imaging device 12, or both, provide input of raw stereo camera images (or raw image data) to the image rectification module 101. In turn, the image rectification module 101 communicates with the stereo correspondence module 103 and the edge detector 105. The edge detector 105 provides an output to the linear Hough transformer 107. The outputs of the stereo correspondence module 103 and the linear Hough transformer 107 are provided to the container localizer 111. The container localizer 111 may access or receive stored (a priori) hitch and cart measurements from the data manager 109. In one embodiment, the container localizer 111 may receive or access and an estimate of the tongue angle the angle estimator 113 (e.g., Kalman filter) and stored hitch and cart measurements.

In the one embodiment, the image rectification module 101 provides image processing to the collected image data or raw stereo images to reduce or remove radial lens distortion and image alignment required for stereo correspondence. The radial lens distortion is associated with the radial lenses of the first imaging device 10, the second imaging device 12, or both. The input of the image rectification module 101 is raw stereo image data, whereas the output of the image rectification module 101 is rectified stereo image data.

In one illustrative embodiment, the image rectification module 101 eliminates or reduces any vertical offset or differential between a pair of stereo images of the same scene of the image data. Further, the image rectification module can align the horizontal component (or horizontal lines of pixels of the stereo images) to be parallel to the scan lines or common reference axis of each imaging device (e.g., left and right imaging device) within the first and second imaging devices (10, 12). For example, the image rectification module may use image processing (e.g., statistical image processing) and calibration information for the image processing devices (10, 12) to achieve rectified right and left images of the stereo image. The rectified image supports efficient processing and ready identification of corresponding pixels or objects within the image in the left image and right image of a common scene for subsequent image processing (e.g., by the stereo corresponding module 103). As used herein, the right image may refer to a first image, a right image or an upper image, whereas the left image may refer to a second image, a left image, or a lower image. As used herein, the right image may refer to a first image, a right image or an upper image, whereas the left image may refer to a second image, a left image, or a lower image.

In one configuration, the stereo correspondence module 103 applies a stereo matching algorithm or disparity calculator to collected stereo image data, such as the rectified stereo image data outputted by the image rectification module 101. The stereo matching algorithm or disparity calculator may comprise a sum of absolute differences algorithm, a sum of squared differences algorithm, a consensus algorithm, or another algorithm to determine the difference or disparity for each set of corresponding pixels in the right and left image (e.g., along a horizontal axis of the images or parallel thereto, or along a vertical axis of the images or parallel thereto, or along another reference axis).

In an illustrative sum of the absolute differences procedure, the right and left images, blocks or rows in image data can be shifted to align corresponding pixels in the right and left image. The stereo matching algorithm or disparity calculator determines a disparity value between corresponding pixels in the left and right images of the image data. For instance, to estimate the disparity value, each first pixel intensity value of a first subject pixel and a first sum of the first surrounding pixel intensity values (e.g., in a block or matrix of pixels) around the first pixel is compared to each corresponding second pixel intensity value of second subject pixel and a second sum of the second surrounding pixel intensity values (e.g., in a block or matrix of pixels) around the second pixel. The disparity values can be used to form a disparity map or image for the corresponding right and left image data.

The image processing module 18 estimate a distance or range from the first imaging device 10, the second imaging device 12, or both to the pixels or points lying on the container perimeter 81, on the container edge 181, on the spout 98, on the spout end 87, or on any other linear edge, curve, ellipse, circle or object identified by the edge detector 105, the linear Hough transformer 107, or both. For example, the image processing module 18 may use the disparity map or image to estimate a distance or range from the first imaging device 10, the second imaging device 12, or both to the pixels or points lying on the container perimeter 81, the container edges 181, the container opening 83, in the vicinity of any of the foregoing items, or elsewhere.

In one embodiment, the container identification module 20 comprises: (1) an edge detector 105 for measuring the strength or reliability of one or more edges 181, or points on the container perimeter 81 in the image data; (2) a linear Hough transformer 107 for identifying an angle and offset of candidate linear segments in the image data with respect to a reference point on an optical axis, reference axis of the one or more imaging devices (10, 12); (3) a container localizer 111 adapted to use spatial and angular constraints to eliminate candidate linear segments that cannot logically or possibly form part of the identified linear segments of the container perimeter 81, or points on the container perimeter 81; and (4) the container localizer 111 transforms the non-eliminated, identified linear segments, or identified points, into two or three dimensional coordinates relative to a reference point or reference frame of the receiving vehicle and harvesting vehicle.

The edge detector 105 may apply an edge detection algorithm to rectified image data from the image rectification module 101. Any number of suitable edge detection algorithms can be used by the edge detector 105. Edge detection refers to the process of identifying and locating discontinuities between pixels in an image or collected image data. For example, the discontinuities may represent material changes in pixel intensity or pixel color which defines boundaries of objects in an image. A gradient technique of edge detection may be implemented by filtering image data to return different pixel values in first regions of greater discontinuities or gradients than in second regions with lesser discontinuities or gradients. For example, the gradient technique detects the edges of an object by estimating the maximum and minimum of the first derivative of the pixel intensity of the image data. The Laplacian technique detects the edges of an object in an image by searching for zero crossings in the second derivative of the pixel intensity image. Further examples of suitable edge detection algorithms include, but are not limited to, Roberts, Sobel, and Canny, as are known to those of ordinary skill in the art. The edge detector 105 may provide a numerical output, signal output, or symbol, indicative of the strength or reliability of the edges 181 in field. For example, the edge detector may provide a numerical value or edge strength indicator within a range or scale or relative strength or reliability to the linear Hough transformer 107.

The linear Hough transformer 107 receives edge data (e.g., an edge strength indicator) related to the receiving vehicle and identifies the estimated angle and offset of the strong line segments (e.g., of the container 85, the spout 89, the spout end 87 and opening 83) in the image data. The estimated angle is associated with the angle or compound angle (e.g., multidimensional angle) from a linear axis that intercepts the lenses of the first imaging device 10, the second image device 12, or both. The linear Hough transformer 107 comprises a feature extractor for identifying line segments of objects with certain shapes from the image data. For example, the linear Hough transformer 107 identifies line equation parameters or ellipse equation parameters of objects in the image data from the edge data outputted by the edge detector, or Hough transformer 107 classifies the edge data as a line segment, an ellipse, or a circle. Thus, it is possible to detect containers or spouts with generally linear, rectangular, elliptical or circular features.

In one embodiment, the data manager 109 supports entry or selection of container reference data by the user interface 44. The data manager 109 supports entry, retrieval, and storage of container reference data, such as measurements of cart dimensions, by the image processing module 18 to give spatial constraints to the container localizer 111 on the line segments or data points that are potential edges 181 of the cart opening 83.

In one embodiment, the angle estimator 113 may comprise a Kalman filter or an extended Kalman filter. The estimator 113 estimates the angle (e.g., 97 in FIG. 5) of the storage portion 93 (e.g., cart) of the receiving vehicle 79 to the propelled portion 75 (e.g., tractor) of the receiving vehicle 79. The angle estimator 113 (e.g., Kalman filter) provides angular constraints to the container localizer 111 on the lines, or data points, that are potential edges 181 of the container opening 83. In configuration, the angle estimator 113 or Kalman filter is coupled to the local izer 111 (e.g., container localizer). The angle estimator filter 113 outputs, or is capable of providing, the received estimated angle of the storage portion 93 relative to the propelling portion 75 of the vehicle.

The localizer 111 is adapted to receive measurements of dimensions of the container perimeter 81 or the storage portion 93 of the vehicle to facilitate identification of candidate linear segments that qualify as identified linear segments of the container perimeter 81. In one embodiment, the localizer 111 is adapted to receive an estimated angle of the storage portion 93 relative to the propelling portion 75 of the vehicle to facilitate identification of candidate linear segments that qualify as identified linear segments of the container perimeter 81. The localizer 111 uses spatial and angular constraints to eliminate candidate lines in the image data that cannot be possibly or logically part of the container opening 83 or container edges 181, then selects preferential lines (or data points on the container edge 81) as the most likely candidates for valid container opening 83 or container edges 181. The localizer 111 characterizes the preferential lines as, or transformed them into, three dimensional coordinates relative to the vehicle or another frame of reference to represent a container perimeter of the container 85.

FIG. 8 is a block diagram that shows the imaging processing module and the spout identification module 22 in greater detail than FIG. 1. Like reference numbers in FIG. 1, FIG. 7 and FIG. 8 indicate like elements. In FIG. 8, the image rectification module 101 communicates with the stereo correspondence module 103 and the spout classifier 121. In turn, the spout classifier 121 provides an output to the spout localizer 125. The spout localizer 125 accesses or receives the spout position from the spout position estimator 123 (or spout angle 98 with respect to the transferring vehicle direction of travel or vehicle reference frame), stereo correspondence data from the stereo correspondence module 103, and the output data from the spout classifier 121.

In one embodiment, the spout identification module 22 comprises a spout classifier 121 that is configured to identify candidate pixels in the image data based at least one of reflectivity, intensity, color or texture features of the image data (or pixels), of the rectified image data or raw image data, where the candidate pixels represent a portion of the spout 89 or spout end 87. The spout localizer 125 is adapted to estimate a relative position of the spout 89 to the imaging device based on the classified, identified candidate pixels of a portion of the spout 89. The spout localizer 125 receives an estimated combine spout position or spout angle 98 relative to the mounting location of the imaging device, or optical axis, or reference axis of one or more imaging devices, based on previous measurements to provide constraint data on where the spout 89 can be located possibly.

The spout classifier 121 applies or includes software instructions on an algorithm that identifies candidate pixels that are likely part of the spout 89 or spout end 87 based on expected color and texture features within the processed or raw image data. For example, in one configuration the spout end 87 may be painted, coated, labeled or marked with a coating or pattern of greater optical or infra-red reflectivity, intensity, or luminance than a remaining portion of the spout 89 or the transferring vehicle. The greater luminance, intensity or reflectivity of the spout end 87 (or associated spout pixels of the image data versus background pixels) may be attained by painting or coating the spout end 87 with white, yellow, chrome or a lighter hue or shade with respect to the remainder of the spout 89 or portions of the transferring vehicle (within the field of view of the imaging devices (10, 12).

In one embodiment, the spout position estimator 123 comprises a Kalman filter or an extended Kalman filter that receives input of previous measurements and container reference data and outputs an estimate of the spout position, spout angle, or its associated error. The spout position estimator 123 provides an estimate of the combine spout position, or spout angle, or its error, relative to one or more of the following: (1) the mounting location or pivot point of the spout on the transferring vehicle, or (2) the optical axis or other reference axis or point of the first imaging device 10, the second imaging device 12, or both, or (3) the axis associated with the forward direction of travel or the heading of the transferring vehicle. The Kalman filter outputs constraints on where the spout 89 or spout end 87 can be located, an estimated spout position, or a spout location zone or estimated spout position zone. In one embodiment, the spout position estimator 123 or Kalman filter is coupled to the spout localizer 125.

The spout localizer 125 takes pixels that are classified as belonging to the combine auger spout and uses a disparity image (from stereo correspondence data) to estimate the relative location of the spout to the first imaging device 10, the second imaging device 12, or both.

Figure 9:
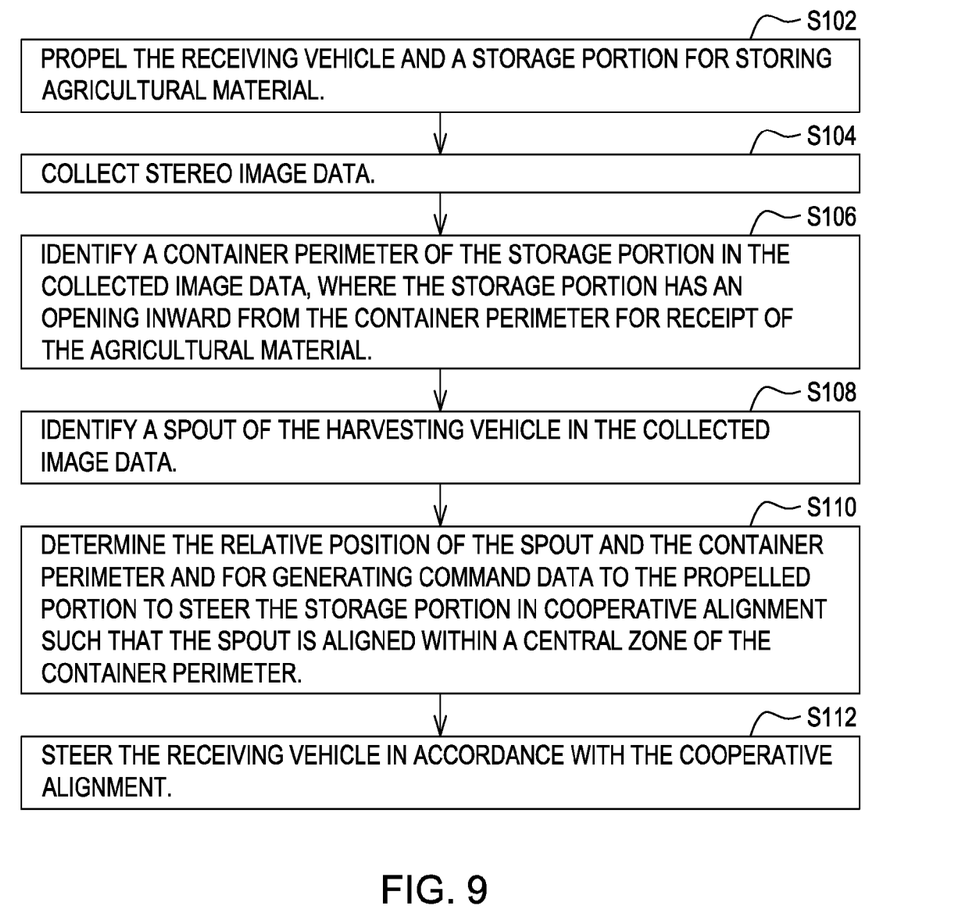
FIG. 9 is a flow chart of yet another method for a stereo vision system for managing the unloading of agricultural material from a vehicle (e.g., combine).

FIG. 9 is a flow chart of a method for managing the unloading of agricultural material from a vehicle or between a transferring vehicle and a receiving vehicle. The method of FIG. 9 begins in step S102 and may use one or more of the following embodiments of the systems (11, 111, 211 or 311) previously disclosed herein.

In step S102, the receiving vehicle (79 in FIG. 5) is propels the receiving vehicle 79 and a storage portion 93 for storing agricultural material.

In step S104, a first imaging device 10, a second imaging device 12, or both collect stereo image data. For example, the first imaging device 10 may be mounted on the transferring vehicle 91 facing the receiving vehicle 79 or the receiving vehicle 79 facing the container 85.

In step S106, an image processing module 18 or a container identification module 20 identifies a container perimeter 81 of the storage portion 93 in the collected image data, where the storage portion 93 has an opening 83 inward from the container perimeter 81 for receipt of the agricultural material. Step S106 may be carried out in accordance with various techniques, which may be applied alternately or cumulatively. Under a first step, the image processing module 18 or container identification module 20 may employ the following processes or sub-steps: (1) measuring a strength of one or more edges 181 in the image data (raw and rectified image data); (2) identifying an angle and offset of candidate linear segments in the image data with respect to an optical axis, reference axis (e.g., direction of travel of the transferring vehicle), or reference point indexed to one or more imaging devices (10, 12); and (3) using spatial and angular constraints to eliminate identified candidate linear segments that cannot logically or possibly form part of the identified linear segments of the container perimeter, where the localizer 111 transforms the identified linear segments into three dimensional coordinates relative to a reference point or reference frame of the receiving vehicle and/or the harvesting vehicle.

Under a second technique, the image processing module 18 or container identification module 20 may receive container reference data, or measurements of dimensions of the container perimeter 81 or the storage portion 93 of the vehicle, to facilitate identification of candidate linear segments, or candidate data points, that qualify as identified linear segments of the container perimeter 81.

Under the third technique, the image processing module 18 or container may receive an estimated angle 97 of the storage portion 93 relative to the propelling portion 75 of the vehicle to facilitate identification of candidate linear segments that qualify as identified linear segments of the container perimeter 81.

Under a fourth technique, the image processing module 18 or container 85 provides the received estimated angle 97 of the storage portion 93 relative to the propelling portion 75 of the vehicle.

In step S108, the image processing module 18 or a spout identification module 22 identifies a spout 89 (or spout end 87) of the transferring vehicle (e.g., harvesting vehicle) in the collected image data. The image processing module 18 or the spout identification module 22 may use various techniques, which may be applied alternately or cumulatively. Under a first technique, the image processing module 18 or the spout identification module 22 identifies candidate pixels in the image data (e.g., rectified or raw image data) based on expected color and expected texture features of the image data, where the candidate pixels represent a portion of the spout 89 (e.g., combine auger spout) or spout end 87.

Under a second technique, the image processing module 18 or the spout identification module 22 estimates a relative position, or relative angle, of the spout 89 or the spout end 87, to the imaging device based on the classified, identified candidate pixels of a portion of the spout 89.

Under a third technique, the image processing module 18 or the spout identification module 22 receives an estimated combine spout position, or spout angle, relative to the mounting location, optical axis, reference axis, or reference point of the imaging device (10, 12) based on previous measurements to provide constraint data on where the spout 56 can be located possibly.

Under a third technique, the image processing module 18 provides the estimated combine spout position, or estimated spout angle, to the spout localizer 125.

In step S110, the image processing module 18 or the alignment module 24 determines the relative position of the spout 89, or the spout end 87, and the container perimeter 81 and for generating command data to the propelled portion to steer the storage portion 93 in cooperative alignment such that the spout 89 (or spout end 87) is aligned with a central zone of the container perimeter 81. The image processing module 18 may use, retrieve or access previously stored data, such as dimensional parameters related to the receiving vehicle, or its container, the dimensional parameters comprising a distance between a trailer hitch and front wheel rotational axis of the storage portion 93. Such dimensional parameters may be entered via a user interface 44 coupled to the vehicle data bus 31 or the image processing module 18, for example.

In one example, if the system (11, 111, 211, 311) is enabled by the operator (e.g., of the receiving vehicle, the transferring vehicle, or both) and if the container 85 (e.g., grain cart) is positioned under the spout 89 (e.g., unloading auger arm) of the transferring vehicle, the system (11, 111, 211, 311) senses the cooperative alignment (e.g., relative position) of spout end 87 with respect to the container 85 or container perimeter 81. For instance, the cooperative alignment (e.g., relative position) is determined by detecting the spout end 87 from which the grain flows and/or by detecting the grain itself (e.g., motion of agricultural material in successive images of the image data) as it flows from the spout end 87 and senses the distance to the spout end 87, agricultural material exiting therefrom, the container perimeter 81, or another feature.

Step S112 may be executed in accordance with various configurations, which may be applied separately or cumulatively. In step S112, in a first configuration, the vehicle controller 46 or the steering controller 32 steers the receiving vehicle in accordance with the cooperative alignment. In a second configuration, the vehicle controller or the steering controller 32 may steer the transferring vehicle in accordance with the cooperative alignment. In a third configuration, the vehicle controller 46 or steering controllers 32 of both the transferring vehicle and the receiving vehicle steer both vehicles in accordance with the cooperative alignment. In a fourth configuration, a servo-motor, electric motor, linear motor and linear-to-rotational gear assembly, or electro-hydraulic device controls the spout angle of the spout 89, or the spout end 87, with respect to the direct of travel or another reference axis of the transferring vehicle in response to vehicle controller 54 or the image processing module 18 (e.g., smart unloading controller).

In a fifth configuration, the system (11, 111, 211, 311) can periodically, regularly or continuously monitor the cooperative alignment (e.g., relative position) between the spout end 87 and the container perimeter 81 (or central or target zone of the container 85). Further, the system can send commands to the receiving vehicle via wireless communication devices (48, 148) and via the vehicle data bus (e.g., vehicle data bus 60 or a CAN bus (ISO Class 3 interface)) to adjust the speed, velocity, or acceleration of the receiving vehicle via the propulsion controller 40 in order to maintain a constant relative position or cooperative alignment.

In a sixth configuration, as the container 85 of the receiving vehicle begins to become full, the agricultural material inside the container 85 was, is or becomes visible to the first imaging device 10, the second imaging device 12, or both. Next, the imaging device (10, 12) can scan or profile the height or level of the agricultural material inside the container 85. With an accurate profile of the height of level of the agricultural material inside the container 85, the system can then execute a container filling strategy that is appropriate for the situation.

For example, the system (11,111, 211, 311) executes a container filling strategy by changing the relative speed, velocity or acceleration of the transferring vehicle and receiving vehicle (e.g., through the ISO Class 3 interface) to promote even or uniform filling of the container 85. As an illustrative example, for a "front-to-back" fill strategy, the system (11, 111, 211, 311) has the receiving vehicle generally maintain a constant fore/aft distance relative to the transferring vehicle (e.g., combine) such that the agricultural material is filling the front volume of the cart and putting weight on the tongue of the connection between the propulsion portion 75 and the storage portion 93 of the receiving vehicle 79. When the front volume of the container 85 becomes full or attains a target volume or mass of agricultural material, the system (11, 111, 211, 311) can command the receiving vehicle to temporarily increase its speed or velocity, or accelerate, relative to the ground (or relative to the transferring vehicle) via the propulsion controller 40 so that the agricultural material flowing from spout 89 drops or moves further toward the rear of the container 85 or storage portion 93 (e.g., from the force of acceleration on the receiving vehicle). During or in preparation for the acceleration, if warranted by the estimated alignment of the spout end 87 and the container perimeter 81 from the alignment module 24 or the image processing module 18, the vehicle controller 46 may suspend rotation temporarily of the auger 47 to avoid spilling agricultural material or missing the container 85, or the alignment module 24 provides command data via the wireless communication devices (48, 148) such that the propulsion controller 40 of the transferring vehicle accelerates simultaneously (e.g., with equal magnitude and direction to the receiving vehicle) to maintain alignment (e.g., substantially the same alignment) between the container perimeter 81 and the spout end 87. The system (11, 111, 211 or 311) or propulsion controller 40 can temporarily increase a relative speed of the receiving vehicle relative to the transferring vehicle if the image processing module 18 senses that a front volume of the storage portion 93 is currently filled to a target level or until the entire storage portion 93 reaches the target fill level. For instance, the system (11, 111, 211, 311) can repeat the process of temporarily increasing the speed or velocity of the receiving vehicle relative to the transferring vehicle during each sampling interval that the image processing module 18 senses that the front volume of the container 85 is currently filled to a target level or until the entire container 85 reaches the desired fill level.

In a seventh configuration, as the container 85 of the receiving vehicle begins to become full, the agricultural material inside the container 85 was, is or becomes visible to the first imaging device 10, the second imaging device 12, or both. Next, the imaging device (10, 12) can scan or profile the height or level of the agricultural material inside the container 85. With an accurate profile of the height of level of the agricultural material inside the container 85, the system can then execute a container filling strategy that is appropriate for the situation.

For example, the system (11,111, 211, 311) executes a container filling strategy by changing the relative speed, velocity or acceleration of the transferring vehicle and receiving vehicle (e.g., through the ISO Class 3 interface) to promote even or uniform filling of the container 85. As an illustrative example, for a "back-to-front" fill strategy, the system (11, 111, 211, 311) has the receiving vehicle generally maintain a constant fore/aft distance relative to the transferring vehicle (e.g., combine) such that the agricultural material is first filling the back volume or rear volume of the cart and putting weight on the tongue of the connection between the propulsion portion 75 and the storage portion 93 of the receiving vehicle 79. When the back volume or rear volume of the container 85 becomes full or attains a target volume or mass of agricultural material, the system (11, 111, 211, 311) can command the receiving vehicle to temporarily decrease its speed or velocity, or brake or decelerate, relative to the transferring vehicle via the propulsion controller 40 so that the agricultural material flowing from spout 89 drops or moves further toward the front of the container 85 or storage portion 93 (e.g., from the force of deceleration on the receiving vehicle). The system (11, 111, 211 or 311) or propulsion controller 40 can temporarily decrease a relative speed of the receiving vehicle relative to the transferring vehicle if the image processing module 18 senses that a rear volume of the storage portion 93 is currently filled to a target level or until the entire storage portion 93 reaches the target fill level. During or in preparation for the deceleration, if warranted by the estimated alignment of the spout end 87 and the container perimeter 81 from the alignment module 24 or the image processing module 18, the vehicle controller 46 may suspend rotation temporarily of the auger 47 to avoid spilling agricultural material or missing the container 85, or the alignment module 24 provides command data via the wireless communication devices (48, 148) such that the propulsion controller 40 of the transferring vehicle decelerates simultaneously (e.g., with equal magnitude and direction to the receiving vehicle) to maintain alignment (e.g., substantially the same alignment) between the container perimeter 81 and the spout end 87. For instance, the system (11, 111, 211, 311) can repeat the process of temporarily decreasing the speed or velocity of the receiving vehicle relative to the transferring vehicle during each sampling interval that the image processing module 18 senses that the rear volume of the container 85 is currently filled to a target level or until the entire container 85 reaches the desired fill level.

The system and method is well-suited for controlling the steering and speed of the transferring vehicle and the receiving vehicle via location determining receivers and wireless communication devices. Further, the system and method facilitates detection of how the container of the receiving vehicle is being filled to adjust the relative lateral alignment, and fore/aft alignment between the spout 89 or spout end 87 and the container perimeter 81 to achieve uniform filling or uniformly distributed height level of agricultural material within the container 85 or storage portion 93. Uniform filling of agricultural material within the container can be realized to minimize certain errors that might otherwise result from fatigue, inexperience or skill shortcomings of the operator of the vehicles, for example.

Having described the preferred embodiment, it will become apparent that various modifications can be made without departing from the scope of the invention as defined in the accompanying claims.

The following is claimed:

1. A system for facilitating the transfer of agricultural material from a harvesting vehicle to a receiving vehicle, the system comprising:
   a receiving vehicle comprising a propelled portion for propelling the receiving vehicle and a storage portion for storing agricultural material;
   a stereo imaging device facing towards the storage portion of the receiving vehicle, the imaging device collecting image data;

a container identification module for identifying a container perimeter of the storage portion in the collected image data, the storage portion having an opening inward from the container perimeter for receipt of the agricultural material;

a spout identification module for identifying a spout of the harvesting vehicle in the collected image data based on color discrimination to identify background pixels from one or more selected spout pixels with associated spout pixel patterns or color attributes on the spout for identification purposes; and an alignment module for determining the relative position of the spout and the container perimeter and for generating command data to the propelled portion to steer the storage portion in cooperative alignment such that the spout is aligned within a central zone of the container perimeter; and a steering controller associated with a steering system of the propelled portion for steering the receiving vehicle in accordance with the cooperative alignment.

2. The system according to claim 1 wherein the stereo imaging device is mounted on the propelled portion of the receiving vehicle.

3. The system according to claim 1 further comprising:
a user interface for entering dimensional parameters related to the receiving vehicle, the dimensional parameters comprising a distance between a trailer hitch and front wheel rotational axis of the storage portion.

4. The system according to claim 1 wherein the container identification module further comprises:
an edge detector for measuring the strength of one or more edges in the image data;
a linear Hough transformer for identifying an angle and offset of candidate linear segments in the image data; and
a container localizer adapted to use spatial and angular constraints to eliminate candidate linear segments that cannot logically form part of the identified linear segments of the container perimeter, the localizer transforming the identified linear segments into three dimensional coordinates relative to the receiving vehicle and harvesting vehicle.

5. The system according to claim 4 further comprising:
the container localizer receiving measurements of dimensions of the container perimeter or the storage portion of the vehicle to facilitate identification of candidate linear segments that qualify as identified linear segments of the container perimeter.

6. The system according to claim 4 further comprising:
the container localizer receiving an estimated angle of the storage portion relative to the propelling portion of the vehicle to facilitate identification of candidate linear segments that qualify as identified linear segments of the container perimeter.

7. The system according to claim 6 further comprising:
an angle estimator for providing the received estimated angle of the storage portion relative to the propelling portion of the vehicle.

8. The system according to claim 7 wherein the angle estimator comprises a Kalman filter.

9. The system according to claim 1 wherein the spout identification module further comprises:
a spout classifier that is configured to identify candidate pixels in the image data based on the color discrimination and at least one of reflectivity, intensity, or texture features of the image data, where the candidate pixels represent a portion of the spout or combine auger spout.

10. The system according to claim 9 further comprising:
a spout localizer for estimating a relative position or relative angle of the spout to the imaging device based on the classified, identified candidate pixels of a portion of the spout.

11. The system according to claim 9 further comprising:
the spout localizer receiving an estimated combine spout position relative to the mounting location of the imaging device based on previous measurements to provide constraint data on where the spout can be located possibly.

12. The system according to claim 11 further comprising:
a spout position estimator for providing the estimated combine spout position to the spout localizer.

13. The system according to claim 12 wherein the spout position estimator comprises a Kalman filter.

14. The system according to claim 1 further comprising:
a propulsion controller for temporarily increasing a relative speed of the receiving vehicle relative to the transferring vehicle if an image processing module senses that a front volume of the storage portion is currently filled to a target level or until the entire storage portion reaches the target fill level.

15. The system according to claim 1 further comprising:
a propulsion controller for temporarily decreasing a relative speed of the receiving vehicle relative to the transferring vehicle if an image processing module senses that a rear volume of the storage portion is currently filled to a target level or until the entire storage portion reaches the target fill level.

16. A method for facilitating the transfer of agricultural material from a harvesting vehicle to a receiving vehicle, the method comprising:
propelling a storage portion of a receiving vehicle for storing agricultural material;
collecting imaging data by a first imaging device on the harvesting vehicle or the receiving vehicle;
identifying a container perimeter of the storage portion in the collected image data, the storage portion having an opening inward from the container perimeter for receipt of the agricultural material;
identifying a spout of the harvesting vehicle in the collected image data based on color discrimination to identify background pixels from one or more selected spout pixels with associated spout pixel patterns or color attributes on the spout for identification purposes; and
determining the relative position of the spout and the container perimeter and for generating command data to the propelled portion to steer the storage portion in cooperative alignment such that the spout is aligned within a central zone of the container perimeter; and
steering the receiving vehicle in accordance with the cooperative alignment.

17. The method according to claim 16 further comprising:
entering, via a user interface, dimensional parameters related to the receiving vehicle, the dimensional parameters comprising a distance between a trailer hitch and front wheel rotational axis of the storage portion.

18. The method according to claim 16 wherein identifying the container perimeter further comprises:
measuring a strength of one or more edges in the image data;
identifying an angle and offset of candidate linear segments in the image data;
using spatial and angular constraints to eliminate candidate linear segments that cannot logically form part of the identified linear segments of the container perimeter; and transforming the identified linear segments into three dimensional coordinates relative to the receiving vehicle and harvesting vehicle.

19. The method according to claim 18 further comprising: receiving measurements of dimensions of the container perimeter or the storage portion of the vehicle to facilitate the identification of candidate linear segments that qualify as the identified linear segments of the container perimeter.

20. The method according to claim 18 further comprising: receiving an estimated angle of the storage portion relative to the propelling portion of the vehicle to facilitate the identification of candidate linear segments that qualify as the identified linear segments of the container perimeter.

21. The method according to claim 20 further comprising: providing the received estimated angle of the storage portion relative to the propelling portion of the vehicle.

22. The method according to claim 16 wherein identifying the spout identification module further comprises:
identifying candidate pixels in the image data based on the color discrimination and at least one of reflectivity, intensity or texture features of the image data, where the candidate pixels represent a portion of the spout or combine auger spout.

23. The method according to claim 22 further comprising: estimating a relative position of the spout to the imaging device based on the classified, identified candidate pixels of a portion of the spout.

24. The method according to claim 22 further comprising: receiving an estimated combine spout position relative to the mounting location of the imaging device, or a spout angle with reference to a pivot point of the spout, based on previous measurements to provide constraint data on where the spout can be located possibly.

25. The method according to claim 24 further comprising: providing the estimated combine spout position to a spout localizer.

26. The method according to claim 16 further comprising: temporarily increasing a relative speed of the receiving vehicle relative to the transferring vehicle if an image processing module senses that a front volume of the storage portion is currently filled to a target level or until the entire storage portion reaches the target fill level.

27. The method according to claim 16 further comprising: temporarily decreasing a relative speed of the receiving vehicle relative to the transferring vehicle if an image processing module senses that a rear volume of the storage portion is currently filled to a target level or until the entire storage portion reaches the target fill level.

28. A system for facilitating the transfer of agricultural material from a harvesting vehicle to a receiving vehicle, the system comprising:
a receiving vehicle comprising a propelled portion for propelling the receiving vehicle and a storage portion for storing agricultural material;
a stereo imaging device mounted on the receiving vehicle and facing towards the storage portion of the receiving vehicle, the imaging device collecting image data;
a container identification module for identifying a container perimeter of the storage portion in the collected image data, the storage portion having an opening inward from the container perimeter for receipt of the agricultural material;
a spout identification module for identifying a spout of the harvesting vehicle in the collected image data; and
an alignment module for determining the relative position of the spout and the container perimeter and for generating command data to the propelled portion to steer the storage portion in cooperative alignment such that the spout is aligned within a central zone of the container perimeter; and
a steering controller associated with a steering system of the propelled portion for steering the receiving vehicle in accordance with the cooperative alignment, wherein the container identification module, the spout identification module, the alignment module, and the steering controller are on the receiving vehicle.

\* \* \* \* \*